(12) United States Patent
Thiel et al.

(10) Patent No.: US 8,234,243 B2
(45) Date of Patent: Jul. 31, 2012

(54) THIRD TIER TRANSACTIONAL COMMIT FOR ASYNCHRONOUS REPLICATION

(75) Inventors: Greg Irving Thiel, Black Diamond, WA (US); Andrew Edgar Goodsell, Redmond, WA (US); Alexander Robert Norton Wetmore, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 759 days.

(21) Appl. No.: 12/142,752

(22) Filed: Jun. 19, 2008

(65) Prior Publication Data

US 2009/0320049 A1    Dec. 24, 2009

(51) Int. Cl.
 *G06F 17/00* (2006.01)
(52) U.S. Cl. .................................... 707/613; 707/611
(58) Field of Classification Search .................. 707/613, 707/611
 See application file for complete search history.

(56) References Cited

U.S. PATENT DOCUMENTS

| | | | |
|---|---|---|---|
| 6,442,552 B1 * | 8/2002 | Frolund et al. ................. | 707/613 |
| 6,636,851 B1 * | 10/2003 | Bamford et al. ........ | 707/999.008 |
| 7,177,866 B2 | 2/2007 | Holenstein et al. | |
| 7,203,712 B2 | 4/2007 | Adiba et al. | |
| 7,240,054 B2 | 7/2007 | Adiba et al. | |
| 7,293,262 B2 * | 11/2007 | Sengodan ..................... | 717/136 |
| 7,389,300 B1 * | 6/2008 | Shah et al. ............. | 707/999.101 |
| 2002/0194015 A1 | 12/2002 | Gordon et al. | |
| 2003/0212789 A1 | 11/2003 | Hamel et al. | |
| 2005/0058261 A1 * | 3/2005 | Baumard ..................... | 379/67.1 |
| 2005/0193024 A1 | 9/2005 | Beyer et al. | |
| 2006/0256786 A1 * | 11/2006 | Bibr et al. ..................... | 370/389 |
| 2007/0064718 A1 * | 3/2007 | Ekl et al. ....................... | 370/432 |
| 2007/0073822 A1 * | 3/2007 | Bennett et al. ................ | 709/206 |
| 2007/0124465 A1 * | 5/2007 | Malloy et al. ................. | 709/224 |
| 2007/0162516 A1 | 7/2007 | Thiel et al. | |
| 2007/0226276 A1 * | 9/2007 | Suzuki et al. ................. | 707/204 |
| 2007/0288537 A1 | 12/2007 | Bourbonnais et al. | |
| 2008/0046400 A1 | 2/2008 | Shi et al. | |
| 2008/0139232 A1 * | 6/2008 | Santhanam ................... | 455/519 |
| 2008/0222159 A1 * | 9/2008 | Aranha et al. .................. | 707/10 |
| 2008/0235294 A1 * | 9/2008 | Girkar et al. .................. | 707/202 |

(Continued)

OTHER PUBLICATIONS

Adams, et al., "Using Adaptive Scheduling for Increased Resiliency in Passive Asynchronous Replication", vol. 3, No. 4, Springer Science & Business Media, Springer-Verlag London Limited, 2007, pp. 333-344.

(Continued)

*Primary Examiner* — Rehana Perveen
*Assistant Examiner* — Tiffany Thuy Bui
(74) *Attorney, Agent, or Firm* — Capitol City TechLaw; Richard C. Irving

(57) ABSTRACT

In embodiments consistent with the subject matter of this disclosure, an application program interface (API) for asynchronously replicating changes made to active data to one or more replicas of the active data may be provided. A calling application may call the API to asynchronously replicate changes made to the active data. Via an interface, the application may indicate whether the changes made to the active data may be asynchronously replicated to a geo-diverse replica of the data, a type of third tier commit for acknowledging replication of the changes to the active data, and/or a number or percentage of acknowledgments to receive with respect to the replication of the changes to the one or more replicas of the active data. Via the API, the calling application may further indicate an amount of time to wait for an acknowledgment of the asynchronous replicating of the changes before continuing.

20 Claims, 5 Drawing Sheets

U.S. PATENT DOCUMENTS

2009/0070391 A1* 3/2009 Blair et al. .................... 707/203
2009/0157766 A1* 6/2009 Shen et al. .................... 707/202

OTHER PUBLICATIONS

Warden, et al., "A Cost-Effective DR and Offsite Backup Solution Using Vizioncore's vRanger PRO and DataCore's SANmelody with Asynchronous Replication", 2003-2006, Las Solanas Consulting, pp. 16.

Levi, "Microsoft SQL 2000 Disaster Recovery with SANRAD V-Switch—Planning Guide", Jan. 10, 2006, pp. 3.

Mitchell, et al., "Storage Solutions with the IBM TotalStorage Enterprise Storage Server and Veritas Software", 2002, IBM, pp. 1-24.

* cited by examiner though only typical embodiments and are not therefore to be considered to be limiting of its scope, implementations will be described and explained with additional specificity and detail through the use of the accompanying drawings.

THIRD TIER TRANSACTIONAL COMMIT FOR ASYNCHRONOUS REPLICATION

BACKGROUND

An asynchronous replication system may replicate, to one or more files, data written to an active file. For example, an asynchronous replication system may replicate, to one or more passive copies of a database, transactional information committed to be written to an active database. However, some latency may be experienced before the transactional information is replicated to the one or more passive copies of the database. Thus, during a latency period, the transactional information may be written to the active database, but not yet written to the one or more passive copies of the database. If the active database fails during the latency period, the one or more passive copies of the database may not have recent updates.

To avoid a possible loss of data, which may occur during a latency period, many turned to fully synchronous replication systems. In a fully synchronous replication system, a write to an active database may not be completed until the write to the active database and replication to one or more copies of the database are completed. However, fully asynchronous replication systems introduce latency based on an amount of time to send data to a remote processing device, including a copy of the database, and an amount of time to receive data, such as, for example, an acknowledgment, from the remote processing device. A problem writing to the one or more copies of the database may propagate back to the active database because the processing device writing to the active database waits for the writing to the one or more copies of the database to complete before attempting another write to the active database. Similarly, a problem writing to the active database may affect writing to the one or more copies of the database because the writing to the one or more copies of the database is not attempted until the writing to the active database is completed.

In addition to the problems mentioned above, a cost of a fully synchronous replication system is higher than a cost of an asynchronous replication system due to a more expensive, higher-quality connection between an active database and one or more copies of the database in a synchronous replication system.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, an application may be provided with an application program interface (API) for replicating, changes made to active data, to one or more replicas of the active data. When calling the API, the application may set one or more parameters to indicate whether the changes made to the active data are to be replicated to a geo-diverse replica of the data, a type of third tier commit, and/or a number or percentage of acknowledgments to receive with respect to writing the changes to the one or more replicas of the active data.

The API may replicate the changes to the active data to one or more geo-diverse replicas of the data, when indicated by the application via an interface. The application may further indicate a type of third tier commit, a number of acknowledgments to receive with respect to replicating the changes, a number or percentage of acknowledgments to receive with respect to the replicating of the changes, and an amount of time to wait for an acknowledgment of replicating the changes before continuing.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
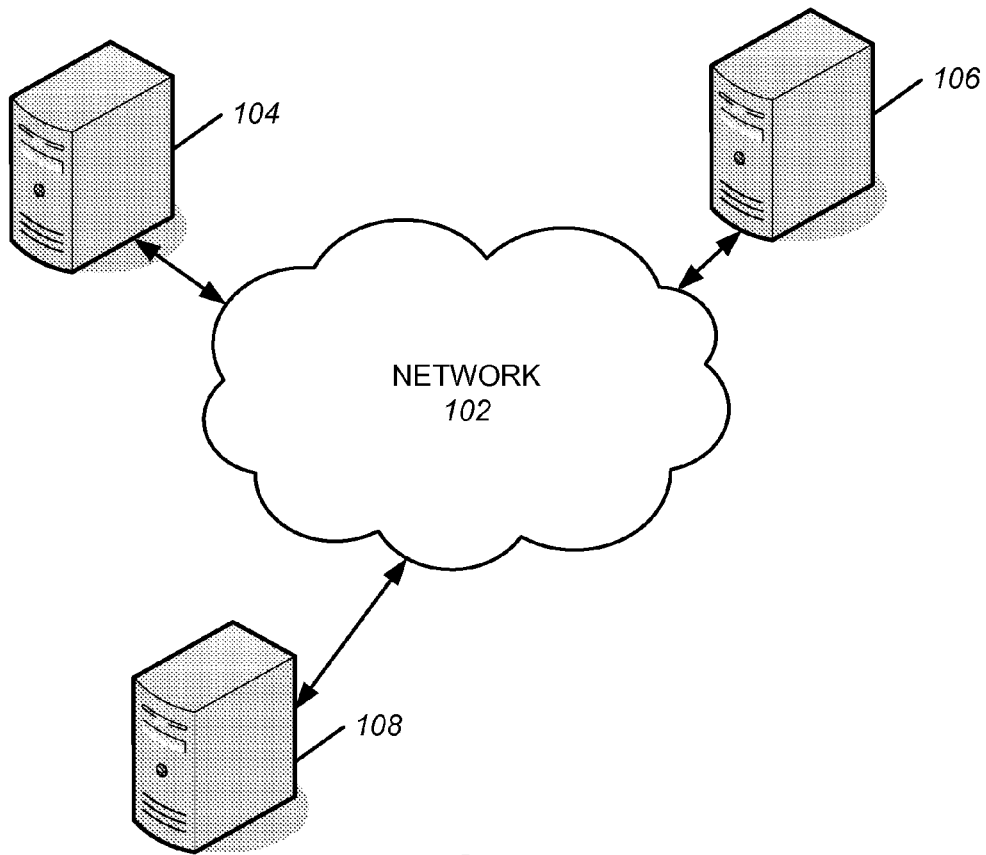
FIG. 1 illustrates an exemplary operating environment for embodiments consistent with the subject matter of this disclosure.

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

An asynchronous replication system may include an application program interface (API) for permitting an application to call processes of the asynchronous replication system. The API may permit the application to replicate, to one or more replicas of data, using a third tier commit, data written to a persisted data store, such as, for example, a database or other persisted data store. In some embodiments the data may include transactional information. In other embodiments, the data may include other types of data. The application may set one or more parameters of the API to indicate whether the data is to be replicated to a geo-diverse replica of data stored in the persisted data store, a type of third tier commit, and/or an amount of acknowledgments to receive with respect to writing to the one or more replicas of the data stored in the persisted data store.

When the application sets a parameter, with respect to geo-diversity, the data may be replicated to one or more geo-diverse replicas of the persisted data store, which may be located in one or more geographically remote areas separate from a geographic area which includes an active copy of the persisted data store.

The application may set a parameter to indicate a type of third tier commit, with respect to replicating the data to one or more replicas of the persisted data store. For example, the application may set the parameter to indicate a level 1 commit, a level 2 commit, or a level 3 commit.

A level 1 commit may indicate that a non-durable commit is to be performed with respect to writing to the persisted data store and asynchronous replication is to be performed with respect to writing to the one or more replicas of the persisted data store. Asynchronous replication may always perform a non-durable commit with respect to the one or more replicas of the persisted data store. A non-durable commit may indicate that a data store engine may commit a transaction, or other data, to a data store, such as a database or other data store, at a later time, and may immediately acknowledge success to a calling application. If a system, including the data store engine, crashes before the data store engine commits the transaction, or the other data, then all changes associated with the transaction, or the other data, may be rolled back.

A level 2 commit may indicate that a durable commit is to be performed with respect to writing to the persisted data store and asynchronous replication is to be performed with respect to the one or more replicas of the persisted data store. In at least some embodiments, the durable commit indicates that the data store engine commits the transaction, or the other data, to the persisted data store before acknowledging success to the calling application. As previously mentioned, asynchronous replication may always perform a non-durable commit to the one or more replicas of the persisted data store.

A level 3 commit may indicate that a durable commit is to be performed with respect to writing to the persisted data store and asynchronous replication is to be performed with respect to the one or more replicas of the persisted data store. The level 3 commit may have sublevels. For example, in one embodiment, the sublevels may include a level 3a and a level 3b. The level 3a may indicate that a non-durable commit is to be performed with respect to a replica of the persisted data store before acknowledging the asynchronous replication. The level 3b commit may indicate that a durable commit is to be performed with respect to the replica of the persisted data store before acknowledging the asynchronous replication.

In some cases, the application may wish to replicate data of a persisted data store to one or more replicas of the persisted data store using a third tier durable commit or a third tier non-durable commit, but the application may not wish to wait more than a specific amount of time for an acknowledgment. The application may accomplish this by setting a parameter to indicate a third tier non-durable commit, or a third tier durable commit, and setting a timeout parameter to indicate the specific amount of time to wait for an acknowledgement. In some embodiments, the timeout parameter may be set to zero to indicate no timeout or to a particular value to indicate a timeout of the particular value of time units. Each time unit may be a millisecond, a tenth of a second, or another suitable unit.

The application may set a parameter to indicate an amount of acknowledgments to receive, with respect to asynchronous replication. For example, the application may set the parameter to a numeric value to indicate a particular number of acknowledgments to receive with respect to the asynchronous replication of data in a persisted data store to replicas of the persisted data store. In some embodiments, the application may set the parameter to a numeric value to indicate a percentage of acknowledgments to receive with respect to the asynchronous replication of the data to replicas of the persisted data store. For example, if the data is to be asynchronously replicated to two replicas of the persisted data store and the parameter is set to 50, then the application may wait for 50% of acknowledgments with respect to the two replicas of the persisted data store (one acknowledgment, in this example). In other embodiments, the parameter may indicate that the application may wait for all acknowledgments, or one acknowledgment, with respect to asynchronously replicating the data to one or more replicas of the persisted data store. In other embodiments, additional or different parameters may be set by an application.

In some embodiments, the API may return an indication of a success or a failure according to how the application may specify, or define, a success or a failure. As an example, the API may indicate to a calling application that a timeout period elapsed before receiving an acknowledgment from as many replicas as requested.

Exemplary Operating Environment

FIG. 1 illustrates an exemplary operating environment for embodiments consistent with the subject matter of this disclosure. The exemplary operating environment may include a network 102 and processing devices 104, 106, 108 connected to network 102.

Network 102 may be a single network or a combination of networks, such as, for example, the Internet or other networks. Network 102 may include a wireless network, a wired network, a packet-switching network, a public-switched telecommunications network, a fiber-optic network, other types of networks, or any combination of the above.

Processing devices 104, 106, 108 may be desktop personal computers (PCs), notebook PCs, servers, server farms, or other types of processing devices associated with a data store, such as, for example, a database, or other data store. Processing devices 104, 106, 108 may communicate with one another via network 102.

The operating environment of FIG. 1 is only exemplary. Other operating environments may have more or fewer processing devices associated with data stores and/or more networks.

Exemplary Processing Device

Figure 2:
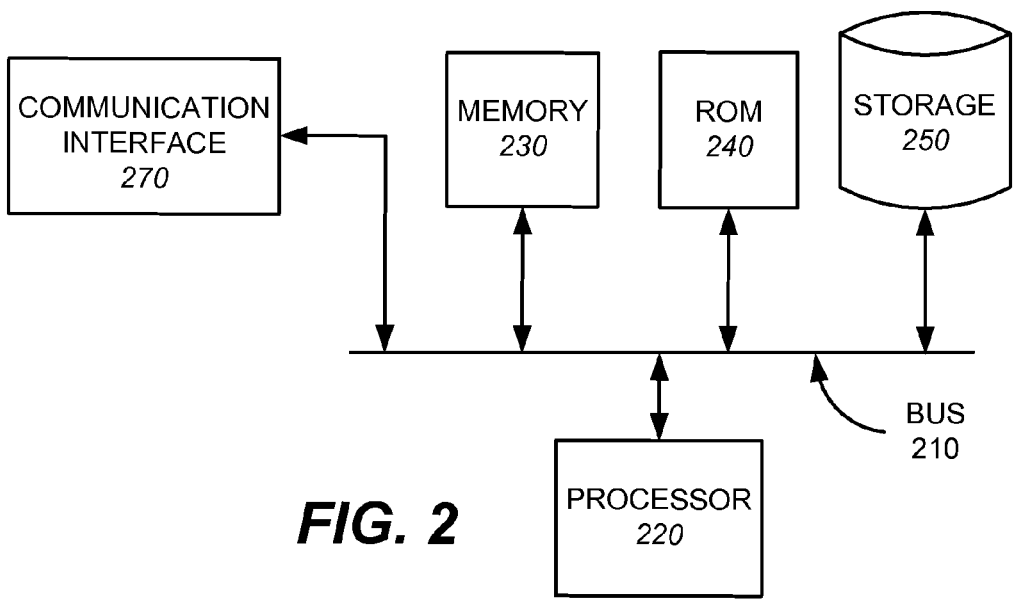
FIG. 2 illustrates a functional block diagram of an exemplary processing device, which may be used to implement embodiments consistent with the subject matter of this disclosure.

FIG. 2 is a functional block diagram of an exemplary processing device 200, which may be used to implement processing devices, such as, processing devices 104, 106, 108 in embodiments consistent with the subject matter of this disclosure. Processing device 200 may be a desktop personal computer (PC), a notebook PC, a server, or other processing device. Processing device 200 may include a bus 210, a memory 230, a read only memory (ROM) 240, a communication interface 270, a processor 220, and a storage device 250. Bus 210 may permit communication among components of processing device 200.

Processor 220 may include at least one conventional processor or microprocessor that interprets and executes instructions. Memory 230 may be a random access memory (RAM) or another type of dynamic storage device that stores information and instructions for execution by processor 220. Memory 130 may also store temporary variables or other intermediate information used during execution of instructions by processor 220. ROM 240 may include a conventional ROM device or another type of static storage device that stores static information and instructions for processor 220. Storage device 250 may include a hard disc and corresponding drive, or other type of data storage device for storing data, such as, for example, a database and/or instructions for processor 220. Communication interface 270 may permit processing device 200 to communicate via a network wirelessly, or through a cable.

Processing device 200 may perform functions in response to processor 220 executing sequences of instructions contained in a machine-readable storage medium, such as, for example, memory 230, ROM 240, or other machine-readable storage media. Such instructions may be read into memory 230 from another machine-readable storage medium or from a separate device via communication interface 270.

Exemplary System

Figure 3:
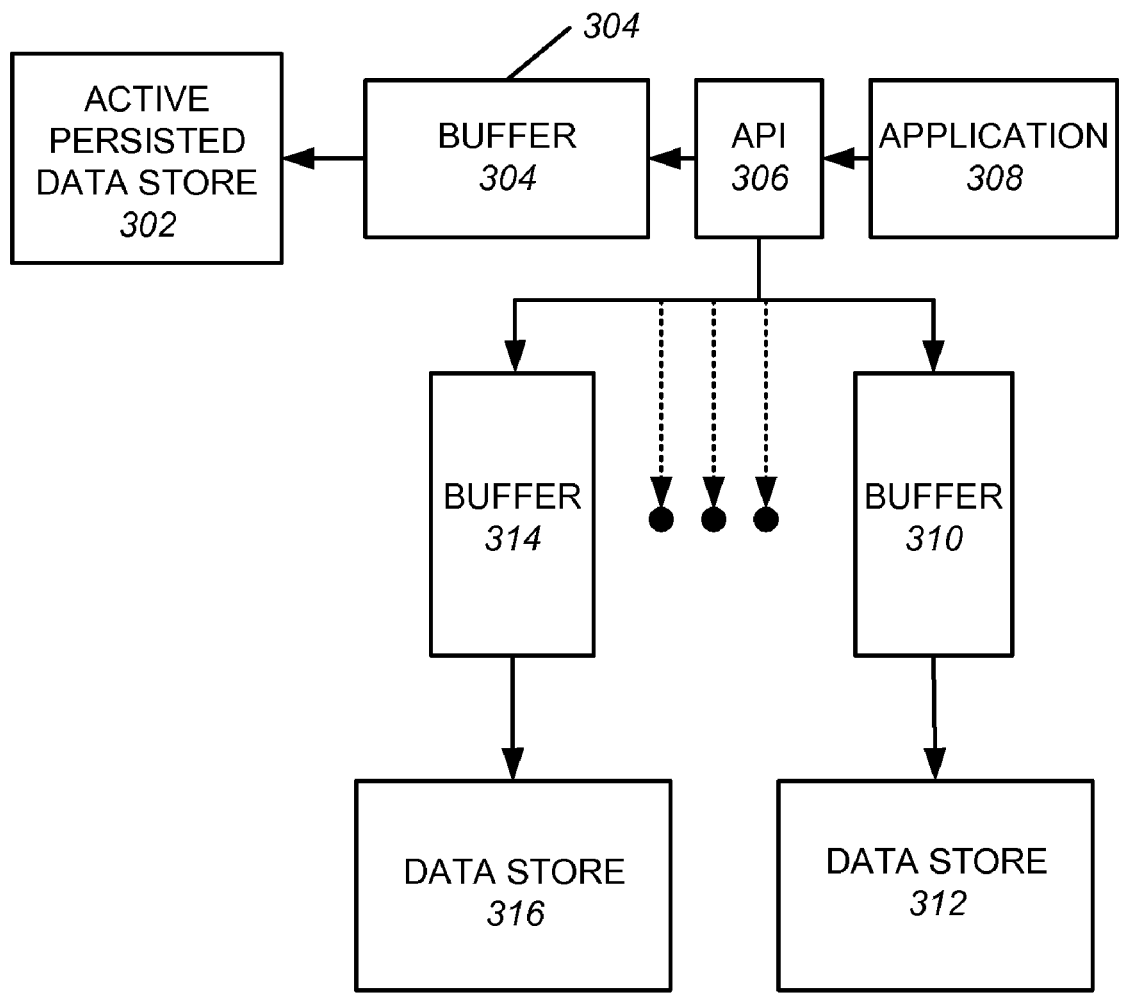
FIG. 3 shows portions of a system, including multiple processing devices, for asynchronously replicating data consistent with the subject matter of this disclosure.

FIG. 3 is a functional block diagram of an exemplary system for asynchronously replicating data consistent with the subject matter of this disclosure. A first processing device may include an active persisted data store 302, a buffer 304, an API 306 for asynchronous replication, and an application 308. A second processing device may include a buffer 314 and a data store 316. A third processing device may include a buffer 310 and a data store 312. In some embodiments, the exemplary system may include additional processing devices or fewer processing devices.

Application 308 may call API 306 to write data to active persisted data store 302 by first writing the data to buffer 304. The data may be written with a durable commit. In some embodiments, API 306 may not return to application 308 until an acknowledgement is received, with respect to writing the data to active persisted data store 302, thus forcing application 308 to wait for an acknowledgment confirming that the data has been written to active persisted data store 302.

API 306 may then asynchronously replicate the data by sending the data to the second processing device and the third processing device. If application 308 indicated that the data is to be asynchronously replicated with a third tier commit, then API 306 may not return to application 308 until one or more acknowledgments are received, thus forcing application 308 to wait for the one or more acknowledgements. The data may be received into buffer 314 of the second processing device and buffer 310 of the third processing device. If application 308 indicated that the data is to be asynchronously replicated with a third tier non-durable commit, upon receiving the data into buffer 314, the second processing device may send an acknowledgment to API 306, and upon receiving the data into buffer 310, the third processing device may send an acknowledgment to API 306. At later points in time, buffer 314 may be written to data store 316 and buffer 310 may be written to data store 312.

If application 308 indicated that the data is to be asynchronously replicated with a third tier durable commit, the second processing device and the third processing device may not send acknowledgments to API 306 upon receiving the data into buffer 314 and buffer 310, respectively. Instead, the second processing device and the third processing device may send acknowledgments to API 306 upon writing buffer 314 to data store 316 and upon writing buffer 310 to data store 312, respectively.

Exemplary Processing

Figure 4:
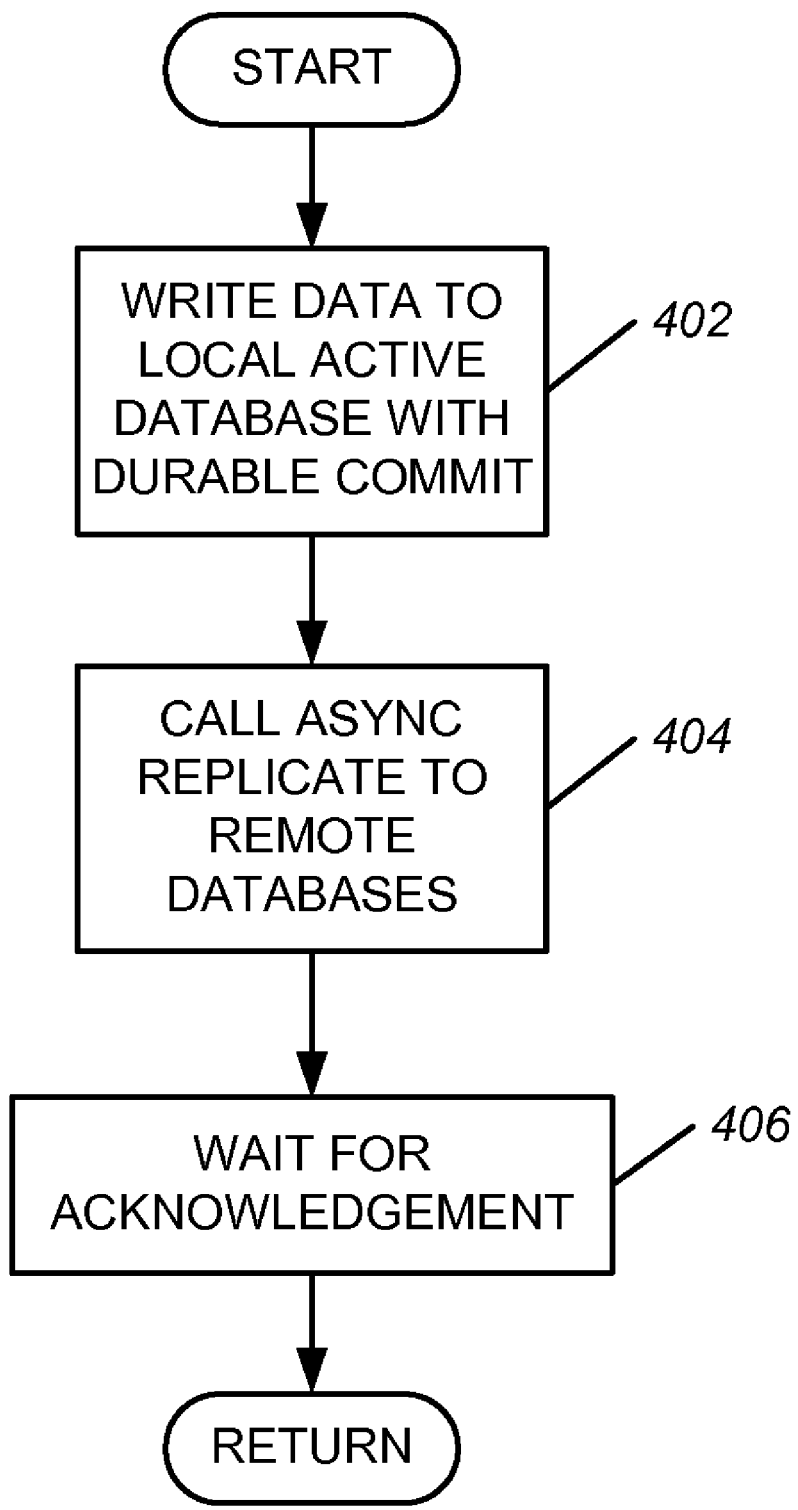
FIGS. 4-6 are flowcharts illustrating exemplary processes, which may be performed in processing devices consistent with the subject matter of this disclosure.

FIG. 4 is a flowchart illustrating an exemplary process, which may be performed by a processing device associated with an active persisted data store, in embodiments consistent with the subject matter of this disclosure. In some embodiments, the process may be included in an API and may be called by an application program. The process may begin with data, such as, for example, transactional information, or other data, being written to a local active persisted data store, with a durable commit (act 402). A process, which may be included in the API, may be called to asynchronously replicate the data to one or more remote data stores (act 404). The data stores may be persisted data stores or volatile data stores. The process may then wait for an acknowledgement indicating that the data has been written, or committed, to the local active persisted data store (act 406).

Figure 5:
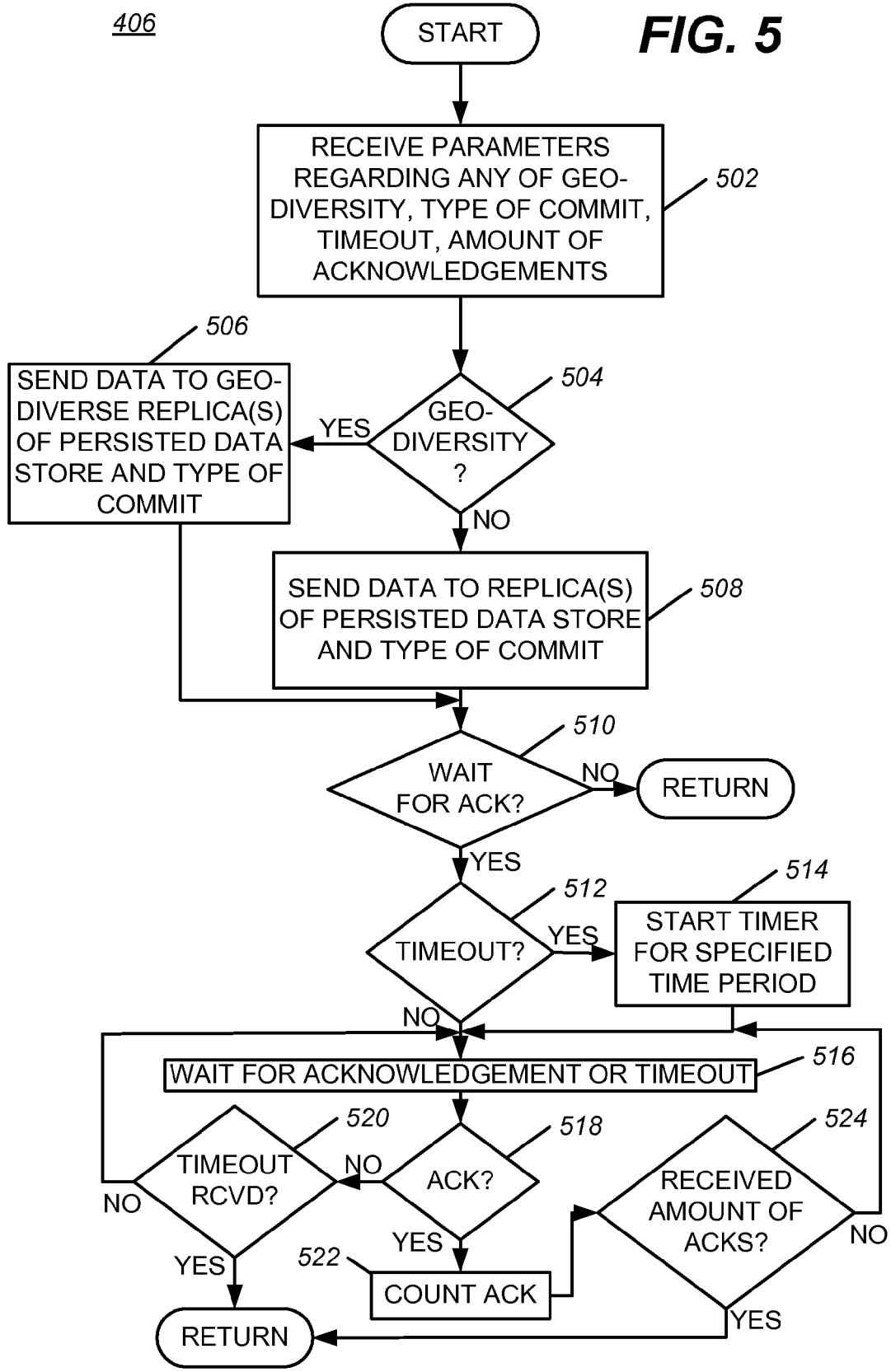

FIG. 5 is a flowchart illustrating an exemplary process for performing act 404 in a processing device associated with the local active persisted data store. The process may begin with receiving, via an interface, parameters with respect to the asynchronous replication of the data (act 502). The parameters may be set by an application when calling a process in the API to write data to an active persisted data store and to asynchronously replicate the data to one or more replicas of the persisted data store. The replicas of the persisted data stores may be persisted data stores or volatile data stores. The parameters may indicate: whether the data is to be written to one or more geo-diverse replicas of a persisted data store; whether the data is to be written with a third tier commit and, if so, a type of the third tier commit; a maximum time period for waiting for an acknowledgment; and an amount of acknowledgments. In other embodiments, the parameters may indicate additional or different information.

The processing device may then determine whether the received parameters indicate that the data is to be replicated to one or more geo-diverse replicas of the persisted data store (act 504). If the processing device determines that the received parameters indicate that the data is to be replicated to one or more geo-diverse replicas of the persisted data store, then the processing device may send the data to one or more processing devices associated with one or more geo-diverse replicas of the persisted data store (act 506).

If, during act 504, the processing device determines that the received parameters indicate that the data is not to be replicated to any geo-diverse replicas of the persisted data store, then the processing device may send the data to one or more processing devices associated with one or more replicas of the persisted data store (act 508).

After performing act 506 or act 508, the processing device may determine whether to wait for an any acknowledgments (act 510). The processing device may determine whether to wait for an acknowledgment based on whether the received parameters indicate no commit, or a third tier commit, such as, for example, a third tier durable commit or a third tier non-durable commit. If the processing device determines that the received parameters indicate no commit, then the process may be completed, and control may be returned to the application, which may continue.

If, during act 510, the processing device determines that the received parameters indicate a third tier commit, such as, for example, a third tier durable commit or a third tier non-durable commit, then the processing device may determine whether the received parameters indicate a timeout period (act 512). If the received parameters indicate a timeout period, then the processing device may start a timer for a specified time period (act 514). A timeout period may be indicated by a value, indicating a number of predefined time units, such as, for example, milliseconds, tenths of a second, or another suitable timeout period. If the value is set to 0, then no timeout period may be indicated.

The processing device may then wait for either an acknowledgment to be received or a timeout to occur (act 516). After an acknowledgment is received or a timeout occurs, the processing device may determine whether the acknowledgment was received (act 518). If the acknowledgment was received, then the processing device may count a number of acknowledgments received, with respect to writing of the data to one or more replicas of the persisted data store (act 522). The processing device may then determine whether the counted number of acknowledgments corresponds to the amount of acknowledgments included in the received parameters (act 524). In some embodiments, the amount of acknowledgements may be a value indicating a number of acknowledgements to receive with respect to the number of replicas of the persisted data store. In other embodiments, the amount of acknowledgements may be a percentage with respect to a number of replicas of the persisted data store. For example, if the percentage is 50 and the data is replicated to 4 data stores, then the amount of acknowledgements may correspond to 2 acknowledgements.

If the counted number of acknowledgments corresponds to the amount of acknowledgments included in the received parameters, then the process may be completed and the application may continue processing. Otherwise, the processing device may wait for another acknowledgment or the timeout (act 516). Because act 406 may be called by an application, either directly, or via another process in an API, during act 516 the application may wait until act 406 is completed.

If, during act 518, the processing device determines that an acknowledgment is not received, then the processing device may determine whether a timeout occurred (act 520). If a timeout occurred, then the process is complete and the application may continue. Otherwise, the processing device may wait for an acknowledgment or a timeout (act 516).

Figure 6:
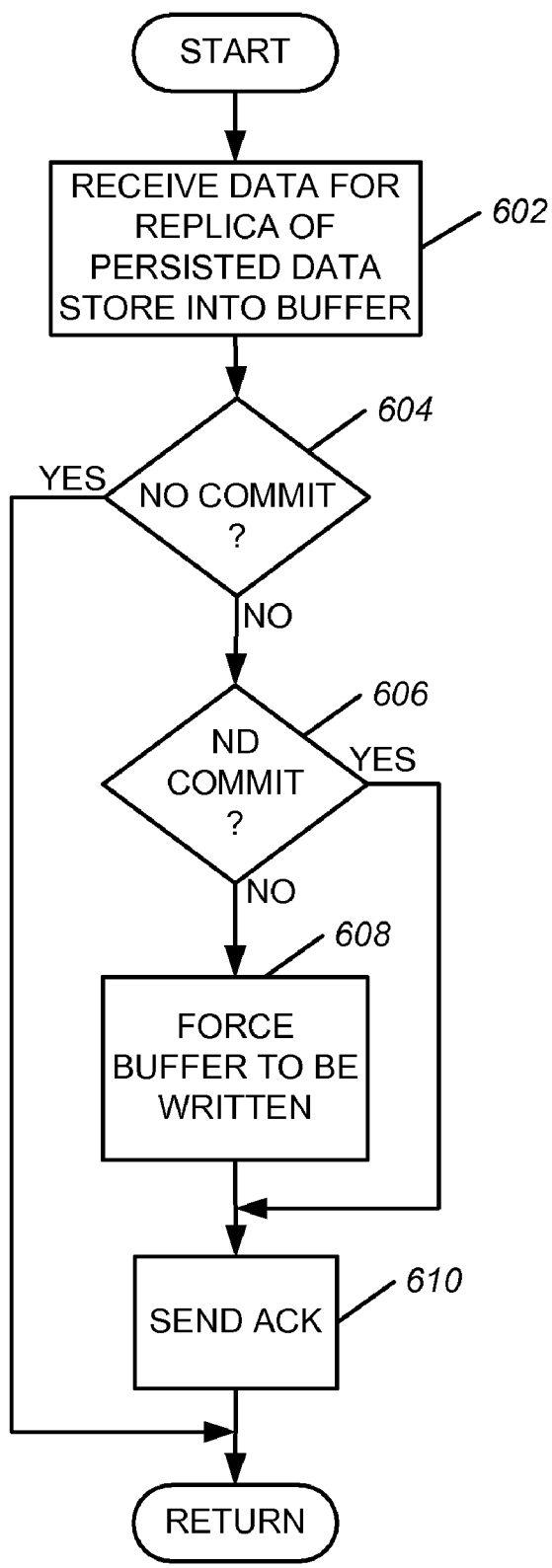

FIG. 6 is a flowchart illustrating an exemplary process which may be performed in a processing device associated with a remote replica of the persisted data store. The process may begin with the processing device receiving, into a buffer, data for the remote replica of the persisted data store (act 602). The received data may indicate whether receipt of the data is to be acknowledged or not acknowledged. If the received data is to be acknowledged, the received data may indicate whether an acknowledgment is to be sent according to a third tier non-durable commit, or a third tier durable commit.

The processing device may then determine if the data is to be received with no commit (act 604). If so, then the process is complete and a sending application, in a processing device which originated sending of the data to the receiving processing device, may continue.

If, during act 604, the processing device determines that the data is to be received with a third tier commit, then the processing device may determine whether the data is to be received with a third tier non-durable commit (act 606). If the processing device determines that the data is to be received with a third tier commit, other than a third non-durable commit (i.e., the processing device may assume that the data is to be received with a third tier durable commit), then the processing device may force any data included in the buffer to be written to the replica of the persisted data store (act 608).

After performing act 608, or after the processing device determines, during act 606, that the data is to be received with a third tier non-durable commit, then the processing device may send an acknowledgment to the processing device including the sending application (act 610). The process may then be completed.

Miscellaneous

The above-described exemplary processes and embodiments refer to writing data to a persisted data store or a replica of a persisted data store. Instead of writing data to a persisted data store, or a replica of a persisted data store, the exemplary processes and embodiments may perform another action, which may result in the data being written to a persisted data store, or a replica of a persisted data store. For example, in some embodiments, data, such as, for example, transactional information, may be written to a log for a persisted data store and the data for the log may be asynchronously replicated, via a log shipping mechanism, to one or more replicas of the log. The log may be used to update an active persisted data store, and the replicas of the log may be used to update respective replicas of the active persisted data store. In other embodiments, instead of using a log and a log shipping mechanism, data may be written to a persisted data store and may be replicated to one or more replicas of the persisted data store via any means. The means may include any sequence of instructions generated by an active data store and received by a passive data store such that contents of the active data store may be reproduced by the passive data store, which may be a persisted data store or a volatile data store.

In some embodiments, transactional information written to a single active persisted data store may be asynchronously replicated to one or more passive replicas of the active persisted data store. In other embodiments, multiple processing devices may write to respective active replicas of a persisted data store and the data may be asynchronously replicated to other active replicas of the persisted data store and passive replicas of the active persisted data store.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described with respect to FIGS. 4-6, or may implement acts in a different order than as shown. Accordingly, the appended claims and their legal equivalents define the invention, rather than any specific examples given.

We claim as our invention:

1. A machine-implemented method for asynchronously replicating information of a persisted data store, the machine-implemented method comprising:

writing the information to an active persisted data store; and asynchronously replicating the information to at least one other data store, by an application calling an application program interface to perform a third tier commit, the application program interface for performing the third tier commit being capable of performing each of a plurality of types of third tier commits with respect to the asynchronous replicating, the plurality of types of third tier commits with respect to the asynchronous replicating including a durable third tier commit and a non-durable third tier commit, the application indicating, via the application program interface, one of the plurality of types of third tier commits to perform with respect to the information replicated to the at least one other data store and whether to wait for fewer than all acknowledgments with respect to the asynchronous replicating to every one of the at least one data store when the at least one data store includes a plurality of data stores, wherein the calling the application program interface to perform the third tier commit further comprises:

providing, by the application when calling the application program interface, a parameter indicating an amount of time to wait for at least one acknowledgement that the information is committed, according to the indicated one of the plurality of types of third tier commits, before continuing.

2. The machine-implemented method of claim 1, further comprising:
waiting, by the application, for an acknowledgement that data related to the information is committed, according to the indicated one of the plurality of types of third tier commits, from a processing device associated with the at least one other data store.

3. The machine-implemented method of claim 1, wherein the at least one other data store includes a second active persisted data store.

4. The machine-implemented method of claim 1, wherein the at least one other data store includes a passive data store.

5. The machine-implemented method of claim 1, wherein:
the calling the application program interface to perform the third tier commit further comprises:
providing, by the application when calling the application program interface, a parameter indicating an amount of acknowledgements to receive from at least one processing device associated with the at least one other data store before continuing.

6. The machine-implemented method of claim 1, wherein:
the calling the application program interface to perform the third tier commit further comprises:
providing, by the application when calling the application program interface, a parameter indicating a percentage of acknowledgements to receive, with respect to the information replicated to the at least one other data store, from at least one processing device associated with ones of the at least one other data store before continuing.

7. The machine-implemented method of claim 1, wherein the calling the application program interface to perform the third tier commit further comprises:
providing, by the application when calling the application program interface, a second parameter indicating whether the information is to be written to one or more geo-diverse replicas of the active persisted data store.

8. A processing device comprising:
at least one processor; and
a memory connected to the at least one processor, the memory including instructions for the at least one processor, such that, when the at least one processor executes the instructions, a method is performed, the method comprising:
writing, to an active persisted data store, data related to a transaction, and
calling an application program interface for asynchronously replicating the data related to the transaction to at least one other data store, the application program interface being capable of performing each of a plurality of types of third tier commits with respect to the asynchronous replicating, the plurality of types of third tier commits with respect to the asynchronous replicating including a durable commit and a non-durable commit, a calling application indicating to the application program interface one of the plurality of third tier commits to perform with respect to the asynchronous replicating to the at least one other data store and an amount of time to wait for at least one acknowledgment that the data related to the transaction is committed according to the indicated one of the plurality of types of third tier commits before continuing, wherein the calling an application program interface for asynchronously replicating the data related to the transaction to at least one other data store further comprises:
indicating, via the application program interface, whether to wait for fewer than all acknowledgements with respect to the asynchronous replicating to every one of the at least one other data store when the at least one other data store includes a plurality of other data stores.

9. The processing device of claim 8, wherein the writing, to an active persisted data store, data related to a transaction further comprises:
performing a durable commit with respect to the writing, to the active persisted data store, the data related to the transaction.

10. The processing device of claim 8, wherein the calling an application program interface for asynchronously replicating the data related to the transaction to at least one other data store further comprises:
indicating, via the application program interface, whether to wait for an acknowledgement with respect to the asynchronous replicating to a geo-diverse replica of the active persisted data store.

11. The processing device of claim 8, wherein the at least one other data store includes at least one other active persisted data store.

12. The processing device of claim 8, wherein the method further comprises:
asynchronously replicating, to the at least one other data store, the data related to the transaction via a log shipping mechanism.

13. The processing device of claim 8, wherein the calling the application program interface to perform the third tier commit further comprises:
providing, by the application when calling the application program interface, a parameter indicating whether the information is to be written to one or more geo-diverse replicas of the active persisted data store.

14. A machine-readable storage device having recorded thereon instructions for at least one processor, such that, when the at least one processor executes the instructions, a method is performed comprising:
providing an application program interface for asynchronously replicating, to at least one other data store, data related to information written to an active persisted data store, the application program interface being capable of performing a plurality of types of third tier commits and providing a calling application with an interface for specifying one of the plurality of types of third tier commits with respect to the asynchronous replicating to the at least one other data store and for specifying whether to wait for fewer than all acknowledgments with respect to the asynchronous replicating when the at least one other data store includes a plurality of other data stores, the plurality of types of third tier commits including a third tier durable commit and a third tier non-durable commit, wherein the application program interface provides a calling application with an interface to specify waiting for up to a specified amount of time for an acknowledgement, with respect to the asynchronous replicating to the at least one other data store, before continuing.

15. The machine-readable storage device of claim 14, wherein the application program interface causes the calling application to wait until an acknowledgement is received, according a specified one of the plurality of types of third tier commits.

16. The machine-readable storage device of claim 14, wherein the at least one other data store includes at least one active persisted data store and at least one passive data store.

17. The machine-readable storage device of claim 14, wherein the at least one other data store includes a plurality of passive data stores.

18. The machine-readable storage device of claim 14, wherein the application program interface provides a calling application with an interface to specify waiting for an acknowledgement with respect to the asynchronous replicating to a geo-diverse replica of the active persisted data store.

19. The machine-readable storage medium of claim 14, wherein the interface provided to the calling application is further for the calling application to specify a parameter indicating a percentage of acknowledgments to receive, with respect to the data asynchronously replicated to at least one other data store, when the at least one other data store includes a plurality of other data stores.

20. The machine-readable storage device of claim 14, wherein the interface provided to the calling application includes a parameter for indicating whether the data related to the information written to the active persisted data store is to be written to one or more geo-diverse replicas of the active persisted data store.

* * * * *